United States Patent
Huynh et al.

(10) Patent No.: US 10,713,261 B2
(45) Date of Patent: Jul. 14, 2020

(54) GENERATING INSIGHTFUL CONNECTIONS BETWEEN GRAPH ENTITIES

(71) Applicant: GOOGLE INC., Mountain View, CA (US)

(72) Inventors: David Francois Huynh, San Francisco, CA (US); Guanghua Li, Shanghai (CN); Chen Ding, Redwood City, CA (US); Yanlai Huang, Shanghai (CN); Ying Chai, Shanghai (CN); Liang Hu, Hubei (CN); Jingxu Chen, Chongqing (CN)

(73) Assignee: GOOGLE LLC, Mountain View, CA (US)

( * ) Notice: Subject to any disclaimer, the term of this patent is extended or adjusted under 35 U.S.C. 154(b) by 1843 days.

(21) Appl. No.: 13/801,616

(22) Filed: Mar. 13, 2013

(65) Prior Publication Data

US 2014/0280044 A1    Sep. 18, 2014

(51) Int. Cl.
    G06F 16/2457    (2019.01)
    G06F 16/2455    (2019.01)
    G06F 16/332     (2019.01)

(52) U.S. Cl.
    CPC .... G06F 16/24575 (2019.01); G06F 16/2455 (2019.01); G06F 16/24578 (2019.01); G06F 16/3323 (2019.01)

(58) Field of Classification Search
    CPC .............. G06F 1/3053; G06F 1/30997; G06F 1/30386; G06F 1/30477; G06F 1/30528;
    (Continued)

(56) References Cited

U.S. PATENT DOCUMENTS 7,398,201 B2   7/2008   Marchisio et al.
7,502,770 B2   3/2009   Hillis et al.
(Continued)

FOREIGN PATENT DOCUMENTS

WO    0014651 A1      3/2000
WO    2010085523 A1   7/2010

OTHER PUBLICATIONS

Kahng, et al, "Ranking Objects by Following Paths in Entity-Relationship Graphs", PIKM '11, Oct. 28, 2011, 8 pages.
(Continued)

*Primary Examiner* — James Trujillo
*Assistant Examiner* — Fariborz Khoshnoodi
(74) *Attorney, Agent, or Firm* — Brake Hughes Bellermann LLP

(57) ABSTRACT

Implementations provide an enhanced search result to improve the user search experience. For example, the result may include insightful information relevant to the search query that was not specifically requested but that the user may find interesting, such as relationships shared between the two entities related to the query, a relationship between the two entities that does not commonly occur with another relationship shared by the entities, or strong secondary connections for an entity related to the query. In some implementations, insightful connections may also be unique facts for a particular entity. Unique facts may represent a superlative attribute of an entity such as, for example, the tallest actor, the oldest president, the most expensive stock, etc. Such shared relationships, rare relationships, and/or unique facts may be provided as part of the search results presented to the query requestor and may provide insight to the requestor about the entity.

12 Claims, 12 Drawing Sheets

(58) Field of Classification Search
CPC .......... G06F 1/30643; G06F 1/309647; G06F 16/907; G06F 16/2423; G06F 16/2455; G06F 16/24575; G06F 16/24578; G06F 16/3323; G06F 16/334

USPC .............................................. 707/722, 723

See application file for complete search history.

(56) References Cited

U.S. PATENT DOCUMENTS

| | | | |
|---|---|---|---|
| 7,512,612 B1* | 3/2009 | Akella | G06F 17/30958 |
| 7,587,387 B2 | 9/2009 | Hogue | |
| 7,672,937 B2 | 3/2010 | Madhavan et al. | |
| 7,765,206 B2 | 7/2010 | Hillis et al. | |
| 7,769,579 B2 | 8/2010 | Zhao et al. | |
| 7,774,328 B2 | 8/2010 | Hogue et al. | |
| 7,792,837 B1 | 9/2010 | Zhao | |
| 7,900,193 B1* | 3/2011 | Kolawa | G06F 11/3604 |
| | | | 717/126 |
| 7,925,610 B2 | 4/2011 | Elbaz et al. | |
| 8,051,104 B2 | 11/2011 | Weissman et al. | |
| 8,122,026 B1 | 2/2012 | Laroco et al. | |
| 8,204,856 B2 | 6/2012 | Meyer et al. | |
| 8,271,480 B2 | 9/2012 | Diab et al. | |
| 8,326,847 B2 | 12/2012 | Balmin et al. | |
| 8,332,409 B2 | 12/2012 | Waddington et al. | |
| 8,370,128 B2 | 2/2013 | Brun et al. | |
| 8,401,797 B2 | 3/2013 | Hlavacek et al. | |
| 8,402,018 B2 | 3/2013 | Lee et al. | |
| 8,407,162 B2 | 3/2013 | Devitt et al. | |
| 8,407,253 B2 | 3/2013 | Ryu et al. | |
| 8,426,512 B2 | 4/2013 | Sharon et al. | |
| 8,429,179 B1 | 4/2013 | Mirhaji et al. | |
| 8,433,661 B2 | 4/2013 | Eggert et al. | |
| 8,442,839 B2 | 5/2013 | Yen et al. | |
| 8,442,940 B1 | 5/2013 | Faletti et al. | |
| 8,725,739 B2* | 5/2014 | Liang | G06F 17/30873 |
| | | | 707/740 |
| 8,775,517 B1* | 7/2014 | Goldman | G06Q 50/01 |
| | | | 705/319 |
| 9,189,567 B1* | 11/2015 | Goldman | G06Q 50/01 |
| 9,235,653 B2 | 1/2016 | Talmon et al. | |
| 2005/0114802 A1 | 5/2005 | Beringer et al. | |
| 2005/0197828 A1* | 9/2005 | McConnell | G06F 17/241 |
| | | | 704/9 |
| 2005/0256889 A1* | 11/2005 | McConnell | G06F 16/288 |
| 2008/0183378 A1* | 7/2008 | Weidner | G01C 21/20 |
| | | | 701/533 |
| 2008/0306934 A1 | 12/2008 | Craswell et al. | |
| 2009/0027392 A1* | 1/2009 | Jadhav | G06Q 10/10 |
| | | | 345/440 |
| 2009/0094211 A1 | 4/2009 | Marvit et al. | |
| 2010/0121839 A1 | 5/2010 | Meyer et al. | |
| 2010/0241649 A1* | 9/2010 | Lewak | G06F 16/907 |
| | | | 707/767 |
| 2011/0040776 A1 | 2/2011 | Najm et al. | |
| 2011/0142169 A1* | 6/2011 | Kelleher | H04L 7/042 |
| | | | 375/316 |
| 2012/0109966 A1 | 5/2012 | Liang et al. | |
| 2012/0173572 A1 | 7/2012 | Babka et al. | |
| 2012/0265767 A1 | 10/2012 | Brdiczka et al. | |
| 2013/0173572 A1 | 7/2013 | Colagiovanni et al. | |
| 2013/0229306 A1* | 9/2013 | Ganeshan | G01S 19/33 |
| | | | 342/357.73 |
| 2013/0254303 A1* | 9/2013 | Cheng | H04L 51/02 |
| | | | 709/206 |
| 2014/0172914 A1* | 6/2014 | Elnikety | G06F 16/9024 |
| | | | 707/774 |
| 2014/0214850 A1* | 7/2014 | Liang | G06F 16/3323 |
| | | | 707/740 |
| 2015/0006501 A1 | 1/2015 | Talmon et al. | |

OTHER PUBLICATIONS

Lao, "Efficient Random Walk Inference with Knowledge Bases", Thesis, The Carnegie Mellon University, Jul. 2012, 139 pages.

Lao, et al, "Fast Query Execution for Retrieval Models Based on Path-Constrained Random Walks", KDD '10, Jul. 25-28, 2010, 8 pages.

Lao, et al, "Random Walk Inference and Learning in A Large Scale Knowledge Base", Conference on Empirical Methods in Natural Language Processing, 2011, 11 pages.

Lao, et al, "Reading the Web with Learned Syntactic-Semantic Inference Rules", Proceedings of the 2012 Joint Conference on Empirical Methods in Natural Language Processing and Computational Natural Language Learning, 2012, 10 pages.

Lao, et al, "Relational retrieval using a combination of path-constrained random walks", Mach Learn (2010) 81, Jul. 22, 2010, pp. 53-67.

Singh, et al, "Large-Scale Cross-Document Coreference Using Distributed Inference and Hierarchical Models", Proceedings of the 49th Annual Meeting of the Association for Computational Linguistics: Human Language Technologies, vol. 1, 2011, 11 pages.

"Automatic Summarization", from Wikipedia, the free encyclopedia, retrieved from http://en.wikipedia.org/wiki/Automatic_summarization, Feb. 25, 2013, 12 pages.

"Concept Mining", from Wikipedia, the free encyclopedia, retrieved from http://en.wikipedia.org/wiki/Concept_mining, Apr. 1, 2012, 2 pages.

"Personalization", from Wikipedia, the free encyclopedia, retrieved from http://en.wikipedia.org/wiki/Personalization, Feb. 26, 2013, 6 pages.

Kersting, et al, "Counting Belief Propagation", UAI 2009, pp. 277-284.

Lardinois, "Google's Knowledge Graph Now Explains Connections Between Your Query and Items in 'People Also Search For' Section", TechCrunch, Oct. 19, 2012, 6 pages.

Mayfield, et al, "ERACER: A Database Approach for Statistical Inference and Data Cleaning", SIGMOD '10, Jun. 6-11, 2010, 12 pages.

Yedidia, et al, "Understanding Belief Propagation and its Generalizations", Mitsubishi Electric Research Laboratories, Nov. 2001, 36 pages.

Extended European Search Report for EP Application No. 14000643.8, dated May 26, 2014, 6 pages.

\* cited by examiner

700

Tom Hanks

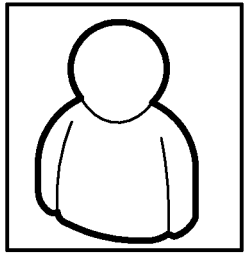

Thomas Jeffrey "Tom" Hanks is an American actor, producer, writer and director. Hanks is known for his roles in Apollo 13, That Thing You Do!, The Green Mile, You've Got Mail, Sleepless in Seattle,... Wikipedia Born: July 9, 1956 (age 56), Concord Net Worth: US$ 350 million (2011) exploredia.com Spouse: Rita Wilson (m.1998), Samantha Lewes (m.1978-1987)

Siblings: Jim Hanks, Sandra Hanks, Larry Hanks

Children: Collin Hanks, Chet Hanks, Elizabeth Ann Hanks, Truman Theodore Hanks

Do you know Tom hanks acted in 49 Drama films?

   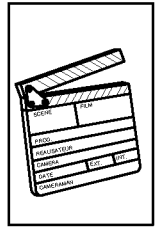 

Extremely Loud and Incredib... 2011

Larry Crowne 2011

Forrest Gump 1994

Cast Away 2000

Saving Private Ryan 1998

Meryl Streep

Movies – *Explore more*

 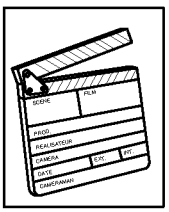 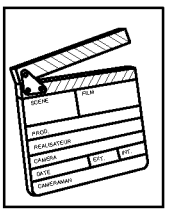

The Iron Lady
2011

Sophie's Choice
1992

The Devil Wears P...
2008

People also search for – *Explore more*

 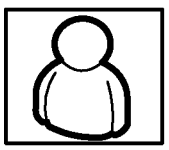 

Margaret Thateher

Glenn Close

Viola Davis

Meryl Streep is also among

- Actors that have won the most number of nominations
- Actors that have won the most number of Oscars Nominations
- Actors that have won the most number of awards
- Actors that have won the most number of Oscars Nominations For Best Actress in a Leading Role

FIG. 9

GENERATING INSIGHTFUL CONNECTIONS BETWEEN GRAPH ENTITIES

BACKGROUND

Search engines traditionally search for query terms that appear in documents, such as web pages accessible over the Internet. But search engines can be used to search other data sources, such as a data graph. A data graph stores information in the form of nodes and edges, with nodes being connected by edges. The node in a data graph may represent an entity, such as a person, place, item, idea, topic, abstract concept, concrete element, other suitable thing, or any combination of these. Entities in the graph may be related to each other by edges, which may represent relationships between entities. For example, the data graph may have an entity that corresponds to the actor Tom Hanks and the data graph may have an acted in relationship between the Tom Hanks entity and entities representing movies that Tom Hanks has acted in. A search engine may search the data graph in addition to another document corpus in responding to search queries in order to provide entity search results in addition to regular search results.

SUMMARY

Some implementations provide an enhanced search result to improve the user search experience. For example, some implementations may provide insightful information relevant to the search query that was not specifically requested but that the user may find interesting. In some implementations, a search query may inspect a query to determine if two or more entities are associated with the query. If so, the search system may interpret the query as a query for relationships shared between the two entities and may provide any such relationships found in a data graph. In some such implementations, the search system may use an entity from a prior search to combine with an entity associated with the current search to provide such relationships. For example, if a search requestor is presented with a result list for a first query that includes links from a list of additional suggested searches, for example a list of people others also searched for, the search system may combine an entity associated with the first query with an entity associated with a selected link and look for relationship between the two entitles in the data graph.

In some implementations, the system may pre-determine insightful relationships for a particular entity and provide the insightful relationships when the system determines that a query relates to the particular entity. An insightful relationship may include a first relationship linking the two entities that does not commonly occur with a second relationship that each entity shares with a third entity. An insightful relationship may also be determined when two entities share a strong secondary connection. In some implementations, insightful connections may also be unique facts for a particular entity. Unique facts may represent a superlative attribute of an entity such as, for example, the tallest actor, the oldest president, the most expensive stock, etc. Such shared relationships, rare relationships, and/or unique facts may be provided as part of the search results presented to the query requestor and may provide insight to the requestor about the entity.

One aspect of the disclosure can be embodied in a system that includes a data graph that links entities by relationships, an index for searching a document corpus, and a query handling system. The query handling system may include at least one processor, and a memory storing instructions that, when executed by the at least one processor cause the query handling system to perform operations. The operations can include receiving a query and generating a search result for the query using the index, based on documents responsive to the query. The operations can also include identifying a first entity from the data graph and a second entity from the data graph corresponding to the query, identifying first-degree paths from the data graph for the first entity, a first-degree path including a relationship and a target entity, and identifying first-degree paths from the data graph for the second entity. The operations can further include determining that at least one first-degree path for the first entity matches at least one first-degree path for the second entity, the at least one matched first-degree path being a matched connection, and including information from the match connection in the search result.

The system can include one or more of the following features. For example, the operations may also include determining that the query resulted from a selection of a representation of the second entity, the representation being part of a search result for a prior search, the prior search corresponding to the first entity.

In some implementations, the query handling system determines that a plurality of first-degree paths match and generates a plurality of matching connections. In such implementations, the operations may also include sorting the matched connections by popularity and including information for a predetermined number of the sorted matched connections in the search result. In some implementations, popularity for a particular matched connection is based on an amount of appearances in the corpus of the target entity associated with the particular matched connection.

In some implementations, the operations can also include assigning each matched connection to a group, sorting the matched connections by popularity within group, and selecting one of the groups for the including as part of including information for the predetermined number of matched connections. In some such implementations, the group with a highest number of matched connections may be selected or the group with a highest number of popular matched connections may be selected.

In another aspect, a method includes receiving a query, the query being associated with a first entity from a data graph and a second entity from the data graph, and generating a search result for the query using an index for searching a document corpus. The method may also include identifying at least one third entity in the data graph that shares a relationship with the first entity and the second entity, the relationship and the third entity being a matched connection and including information from the matched connection in the search result.

The method can include one or more of the following features. For example, the method can also include determining that the query resulted from a selection of a representation of the second entity, the representation being part of a search result for a prior query, the prior query corresponding to the first entity. As another example, the query is a combination of a current query and a prior query and the first entity corresponds to the prior query and the second entity corresponds to the current query.

In another aspect, a method includes receiving, using at least one processor, a query that corresponds to a first entity associated with a data graph and identifying a second entity in the data graph connected to the first entity by a first path in the data graph and by a second path in the data graph. The first path may have a single relationship between the first entity and the second entity and the second path may have two matching relationships that connect the first entity and the second entity via a third entity. The method may further include including information about the first path and the second path in a search result for the query.

The method can include one or more of the following features. For example, identifying the second entity can include generating a first-degree entity graph for the first entity and a second-degree entity graph for the first entity. The first-degree entity graph can have first-degree paths each comprising a first-degree relationship and a first-degree entity, with the first path being one of the first-degree paths. The second degree entity graph can have second-degree paths each comprising a first second-degree relationship, a second second-degree relationship, and a second-degree entity, the second path being one of the second degree paths. The method may further include identifying matching paths by identifying a first-degree entity in the first-degree paths that matches a second-degree entity in the second-degree paths and determining whether the first second-degree relationship and the second second-degree relationship of the matching path are of the same type. In some implementations, identifying further includes incrementing a first counter for the first-degree relationship when the matching path is identified and incrementing a second counter for a combination of the first-degree relationship and the first second-degree relationship when it is determined that the first second-degree relationship has the same type as the second second-degree relationship. In such implementations, the method may also include using the information about the first path in the search result when a difference between the first counter and the second counter indicates a low probability of co-occurrence.

The method can also include one or more of the following features. For example in some implementations identifying is done offline and the method further includes storing data corresponding to the first entity, the second entity, the first path, and the second path is stored in a memory; and retrieving the stored data after receiving the query.

In another aspect, a method includes receiving, using at least one processor, a query that corresponds to a first entity associated with a data graph and identifying a second entity in the data graph connected to the first entity by a plurality of paths. Each of the paths of the plurality of paths has two relationships that connect the first entity and the second entity via a third entity and each path of the plurality of paths has the same two relationships but a different third entity. The method can also include using information about the first entity and the second entity in a search result for the query. In some implementations, the method also includes excluding commonly occurring entities and commonly occurring relationships from the paths considered as part of the identifying. In some implementations, the method can also include determining whether an amount of paths in the plurality of paths meets a threshold and performing the including when the amount meets the threshold.

In another aspect, a system includes a data graph that links entities by relationships and a query handling system. The query handling system includes at least one processor and a memory storing instructions that, when executed by the at least one processor, cause the query handling system to perform operations. The operations can include generating a first-degree entity graph for a particular entity in the data graph and generating a second degree entity graph for the particular entity. The first-degree entity graph has first-degree paths each comprising a first-degree relationship and a first-degree entity and the second degree entity graph has second degree paths each comprising a first-second-degree relationship connecting to a first second-degree entity and a second second-degree relationship connecting the first second-degree entity to a second second-degree entity. For a particular second second-degree entity in the second-degree paths the operations may also include assigning each second second-degree relationship to a group, determining an amount of second second-degree relationships in each group, determining that the amount meets a threshold, and storing data relating to the particular entity, the second second-degree entity, and the group in a memory for later retrieval in response to queries. For a particular first-degree entity in the first-degree paths, the operations may also include identifying at least one matching path by identifying a second-degree entity in the second-degree paths that matches the particular first-degree entity, determining whether the first second-degree relationship and the second second-degree relationship of the matching path are of the same type, and storing data relating to the particular entity and the matching paths for later retrieval in response to queries when the first second-degree relationship and the second second-degree relationship are of the same type.

In some implementations, the system may also include an index for searching a document corpus. In such implementations, the query handling system provides a search result in response to queries that includes information from the index and information based on the stored data relating to the particular entity. In some implementations, the operations performed by the query handling system may include receiving a query that relates to the particular entity, retrieving the data, and including information from the data in a query result responsive to the query. As another example, the operations performed by the query handling system can include excluding commonly occurring entities and commonly occurring relationships from the first-degree entity graph and second-degree entity graph. As another example, as part of assigning each second second-degree relationship to a group the operations performed by the query handling system to perform operations include assigning each combination of first second-degree relationship and second second-degree relationship to a group.

In another aspect, a method includes retrieving, using at least one processor, a plurality of entities from a data graph that meet predetermined criteria for a collection, computing a fact-value for each of the plurality of entities, resulting in a set of fact-values, and identifying an outlier value from the set of fact-values. The method also includes storing an entity identifier, a collection identifier, and a fact identifier for the outlier value in a memory. The method can include receiving a query that relates to a particular entity, determining whether an identifier for the particular entity matches the stored entity identifier for the outlier value, and including information relating to the outlier value in a result list for the query when it is determined that the identifier for the particular entity matches the stored entity identifier for the outlier value.

The method can also include one or more of the following features. For example the method may also include receiving a second query, determining that the second query relates to the collection, and including information relating to the outlier value in a result list for the second query.

In another aspect a tangible computer-readable storage medium having recorded and embodied thereon instructions that, when executed by one or more processors of a computer system, cause the computer system to perform any of the methods or operations previously described.

One or more of the implementations of the subject matter described herein can be implemented so as to realize one or more of the following advantages. As one example, the system may enhance the user's search experience by providing interesting and insightful connections relating to the subject of the user's query. Such connections may not have been specifically requested, but may be of interest to the user. Furthermore, the connections may be pre-computed from a large data graph so that information from complex relationships that use large amounts of processing power can be provided as part of a low-latency search result.

The details of one or more implementations are set forth in the accompanying drawings and the description below. Other features will be apparent from the description and drawings, and from the claims.

BRIEF DESCRIPTION OF DRAWINGS

FIG. 7 illustrates an example of a user interface showing a strong secondary connection as part of a search result, in accordance with some implementations.

FIG. 9 illustrates an example of a user interface showing unique facts as part of a search result, in accordance with some implementations.

Like reference symbols in the various drawings indicate like elements.

DETAILED DESCRIPTION

Figure 1:
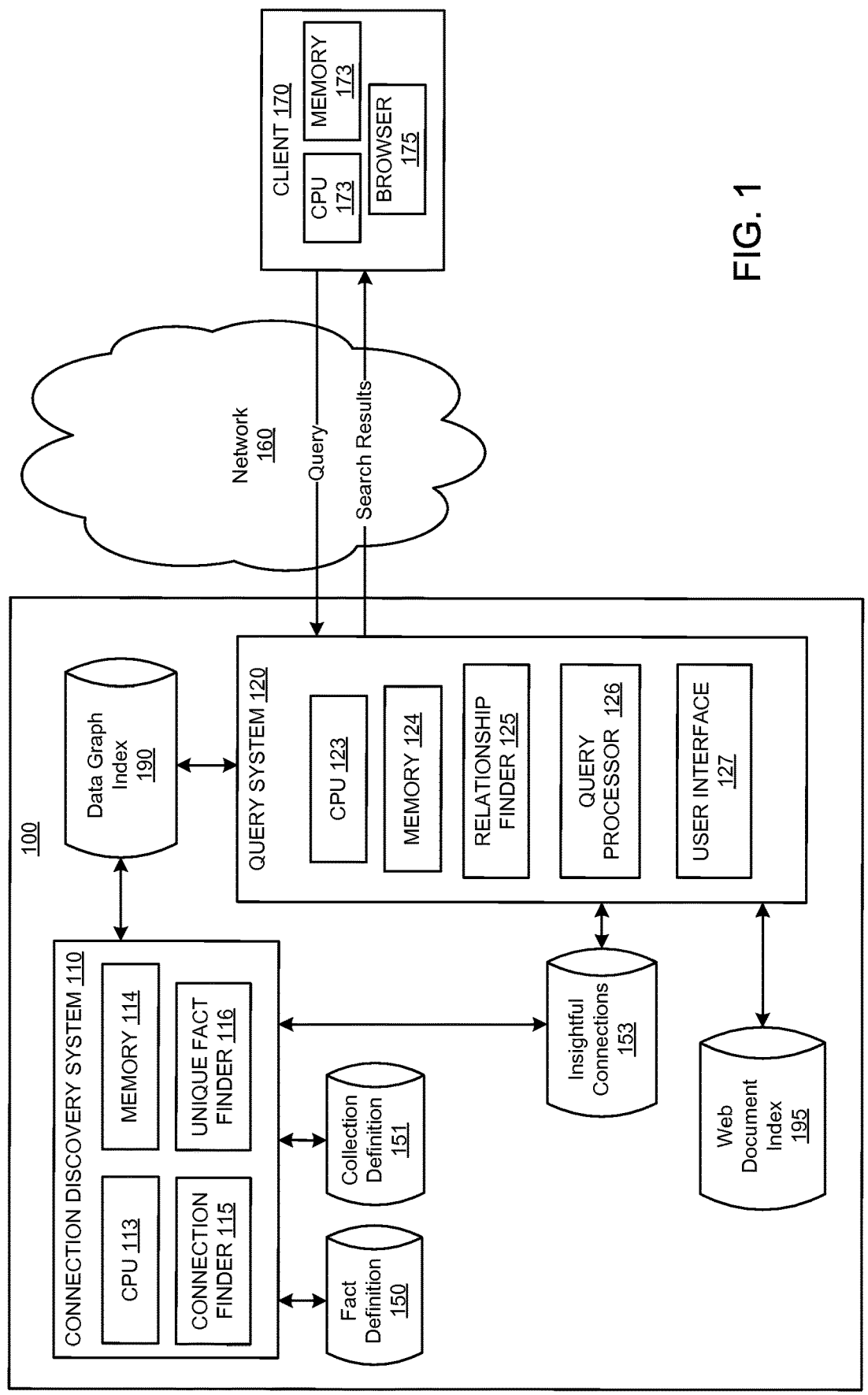
FIG. 1 illustrates an example system in accordance with some implementations.

FIG. 1 is a block diagram of a search system 100 in accordance with an example implementation. The system 100 may be used to implement a search engine that provides insightful connections as part of search results for a particular query. The depiction of system 100 in FIG. 1 is described as a search engine system for an Internet corpus and a data graph that includes entities associated with the Internet corpus that provides insightful connections in response to a query. Other configurations and applications of the described technology may be used. For example, the insightful connections may be used in fraud detection, marketing, or other data mining tasks. In some implementations the search engine may search the data graph without providing search results from a separate corpus of documents.

Figure 12:
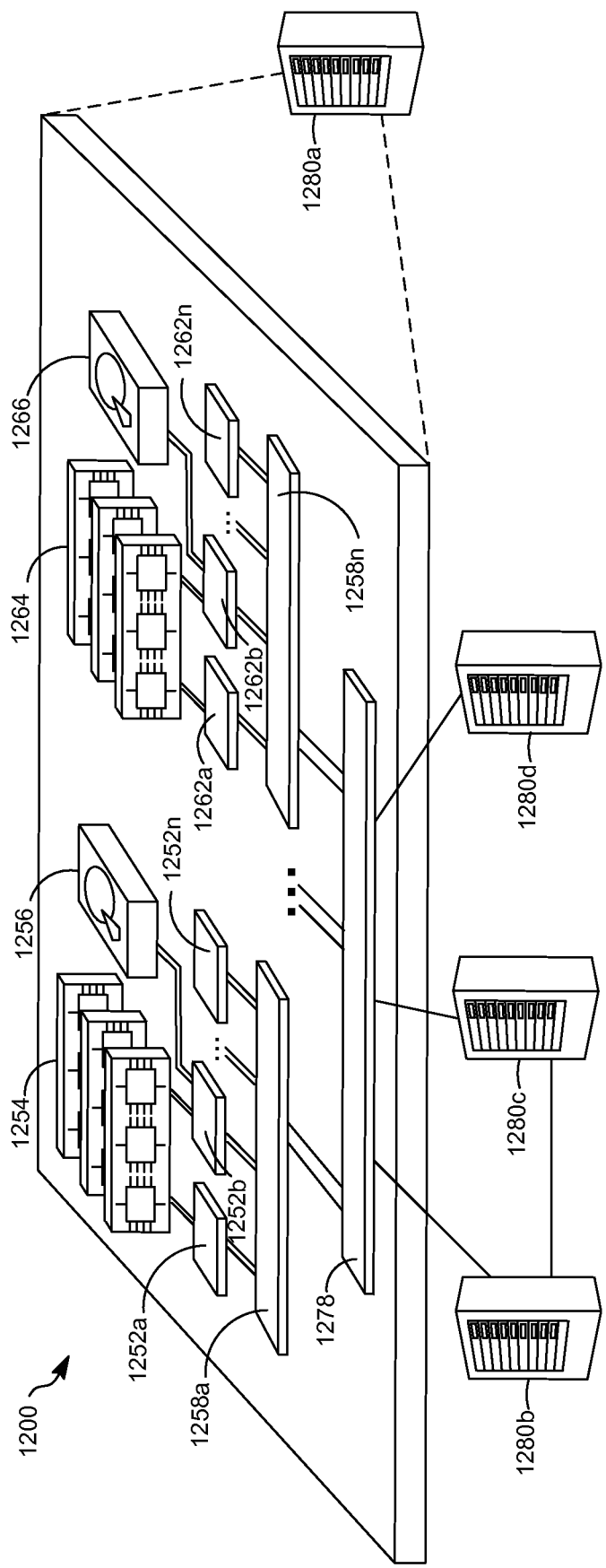
FIG. 12 shows an example of a distributed computer device that can be used to implement the described techniques.

The data graph search system 100 may include connection discovery system 110 and query system 120. Connection discovery system 110 and query system 120 may be computing devices that take the form of a number of different devices, for example a standard server, a group of such servers, or a rack server system. In some implementations, connection discovery system 110 and query system 120 may be a single system sharing components such as processors and memories. In addition, connection discovery system 110 and query system 120 may be implemented in a personal computer, for example a laptop computer. The connection discovery system 110 and query system 120 may be examples of computer device 1200, as depicted in FIG. 12.

The search system 100 may include an index 190 for a graph-based datastore. Index 190 may allow a query processor to determine entities and relationships stored in the corresponding data graph. The data of index 190 may include information from which a graph, such as the graph illustrated in FIG. 2 can be created. The nodes of the data graph may be referred to as entities and the edges may be referred to as relationships between two entities. As used herein, entity may refer to a physical embodiment of a person, place, or thing or a representation of the physical entity, e.g., text, or other information that refers to an entity. For example, an entity may be the physical embodiment of Tom Hanks or an abstract concept that refers to Tom Hanks. The search system may also include an index 195 that stores terms or phrases that appear in a document of a corpus. For example, index 195 may store terms or phrases that appear in documents available over the Internet.

The web document index 195 and the data graph index 190 may be stored on a tangible computer-readable storage device, for instance disk, flash, cache memory, or a combination of these, configured to store data in a semi-permanent or non-transient form. In some implementations index 195 and 190 may be stored in a combination of various memories. Index 190 may store posting lists for entities and relationships in the data graph. In some implementations, index 190 may be a two-dimensional posting list in that each posting list value has one or more associated intersection identifiers and each intersection identifier may have one or more associated result identifiers. The posting list may be for an entity or for a relationship. If the posting list is for an entity, the intersection identifiers may be relationship identifiers. If the posting list is for a relationship, the intersection identifiers may be entity identifiers. For example, if entity a is connected to entities b and c by relationship d in the data graph, a posting list for entity a may have the identifier for relationship d as the intersection identifier and the identifiers for b and c as result identifiers for the intersection identifier for relationship d. In some implementations, index 195 may store one-dimensional posting lists that include phrases or terms as posting list values and, for each posting list value, identifiers for documents that contain the phrase or term. While index 190 and index 195 have been described as using posting lists, each index may have some other format.

Connection discovery system 110 can include one or more processors 113 configured to execute one or more machine executable instructions or pieces of software, firmware, or a combination thereof. The connection discovery system 110 can include, an operating system (not shown) and one or more computer memories 114, for example a main memory, configured to store data, either temporarily, permanently, semi-permanently, or a combination thereof. The memory may include any type of storage device that stores information in a format that can be read and/or executed by processor 113. Memory 114 may include volatile memory, non-volatile memory, or a combination thereof, and store modules that, when executed by processor 113, perform certain operations. In other implementations, the modules may be stored in an external storage device (not shown) and loaded into memory 114. The modules, such as connection finder 115 and unique fact finder 116, may enable connection discovery system 110 to generate pre-computed insightful connections for various entities that may be stored in insightful connections 153.

For example, connection finder 115 may read information from data graph index 190 to determine the entities that share rare connections or strong secondary connections. Once found, connection finder 115 may store the connections in insightful connections 153 for later use in responding to search queries. Because identifying rare and strong secondary connections may impact query latency and such connections are not dependent on a query, connection finder 115 may determine these insightful connections offline, independently of any particular query. Once a connection is found for a particular entity, connection finder 115 may store the connection by an entity identifier so that the connections may be easily identified and retrieved for inclusion in search results.

Unique fact finder 116 may identify unique facts for various entities. For example, unique fact finder 116 may look for entities with outlier values for predetermined attributes within a collection. If an entity has an outlier value, for example the largest height attribute, the unique fact finder 116 may store information about the fact and collection using an entity identifier in, for example, insightful connections 153. Such information may then be included in search results for appropriate entities.

Like connection discovery system 110, query system 120 may include one or more processors 123, an operating system (not shown) and one or more computer memories 124. Query system 120 may include modules, stored in memory 124 or an external storage device (not shown) and loaded into memory 124 that enable the query system 120 to receive and respond to queries. For example, the modules may include a relationship finder 125, a query processor 126, and a user interface 127. Query processor 126 may receive queries from requestors, such as client 170, analyze the query to determine how to search indexes 190 and 195, and initiate the search of the indexes. Query processor 126 may also receive search results, compile and format the results, and determine what results to return to the requestor. In some implementations, query processor 126 may work with user interface 127 to provide data used to display the search results. Query processor 126 may also work with relationship finder 125. Relationship finder 125 may receive an indication of two entities, for example from query processor 126, and search for common connections between the two entities in the data graph index 190.

Query system 120 may include one or more servers that receive queries from a requestor, such as client 170, and provide those queries to the query system 120. The query system 120 may be responsible for searching web document index 195,—data graph index 190, and potentially other data sources for results responsive to a query. Search results may include information from documents responsive to the query or information for entities responsive to the query. For example, the query system 120 may receive a query from a client, such as client 170, perform some query processing using query processor 126, and retrieve results from web document index 195 and data graph index 190. In addition, the query processor 126 may work with relationship finder 125 to identify relationships between two entities associated with the query or between an entity from the current query and an entity from a prior query. In some implementations the prior query may be from a user's browser history, if such a history is kept. In some implementations, the prior query may be a query that supplied a link selected by the query requester, the selection initiating the current query.

The query processor 126 may obtain search results from the various sources and provide the compiled results to client 170 through user interface 127. Query system 120 may be in communication with client(s) 170 over network 160. Network 160 may be for example, the Internet or the network 160 can be a wired or wireless local area network (LAN), wide area network (WAN), etc., implemented using, for example, gateway devices, bridges, switches, and/or so forth. Via the network 160, the query system 120 may communicate with and transmit data to/from clients 170.

Figure 3:
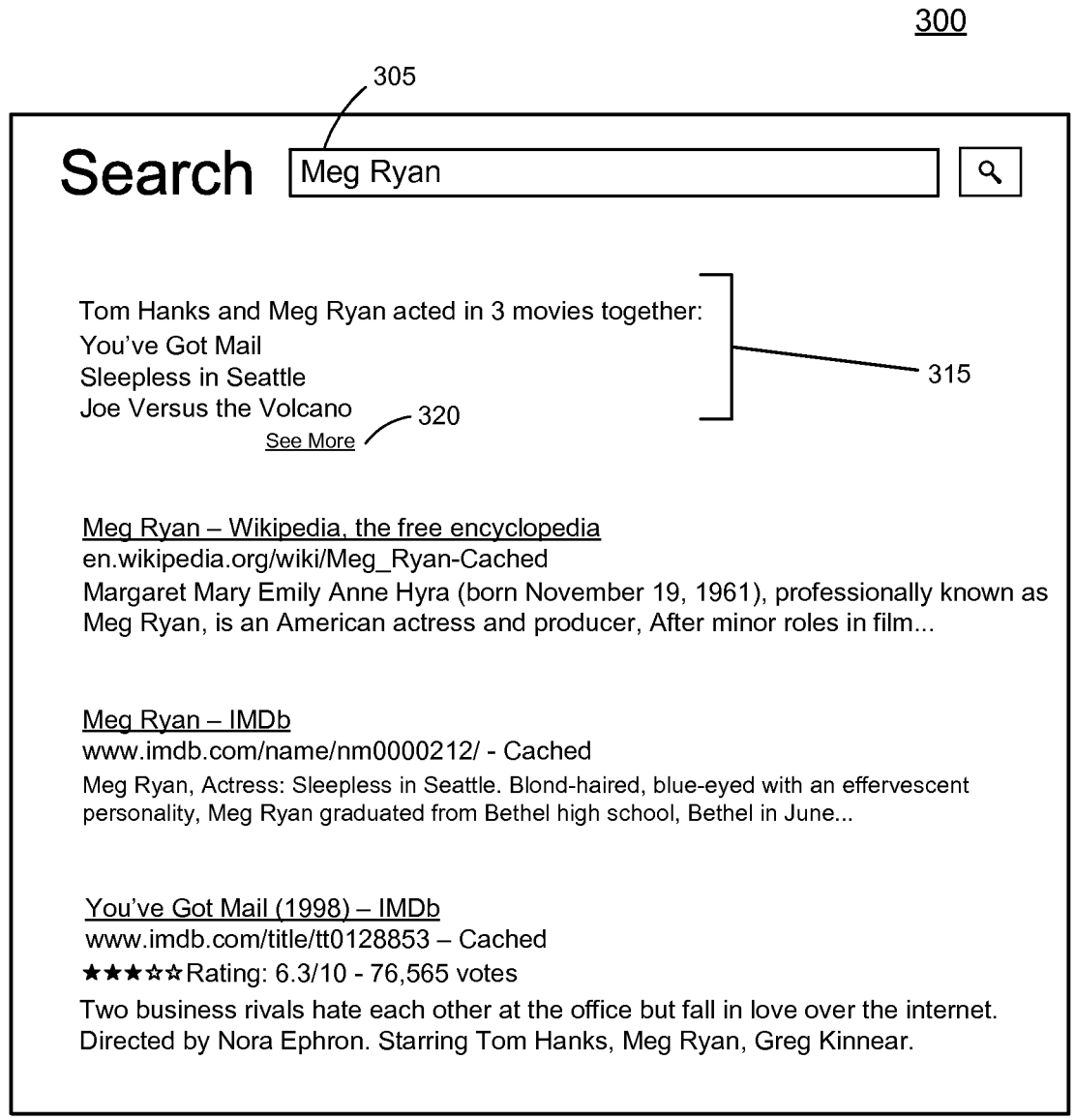
FIG. 3 illustrates an example of a user interface showing common connections between two entities as part of a search result, in accordance with some implementations.

FIG. 3 illustrates an example of a user interface 300 showing common connections between two entities as part of a search result, in accordance with some implementations. A query system, such as query system 120 of FIG. 1, may generate information used to display user interface 300 in responding to queries from client 170. In the example of FIG. 3, a user has submitted a current query 305 of "Meg Ryan." The current query 305 may have been typed by a user or may have been submitted when a user selected a link from a prior search result. In the example of FIG. 3 the previous query was for "Tom Hanks" The search result for Tom Hanks may include people or things often related to Tom Hanks, for example a list of people that other users have searched for together with Tom Hanks A query processor, such as query processor 126 of FIG. 1, may determine that the current query and the previous query both relate to entities, namely the entities Tom Hanks and Meg Ryan in the data graph. Accordingly, the query processor may obtain connections shared by the two entities. The shared connections 315 may be provided as part of the search results in user interface 300. In some implementations the shared connections may appear before documents responsive to the query terms "Meg Ryan."

Figure 4:
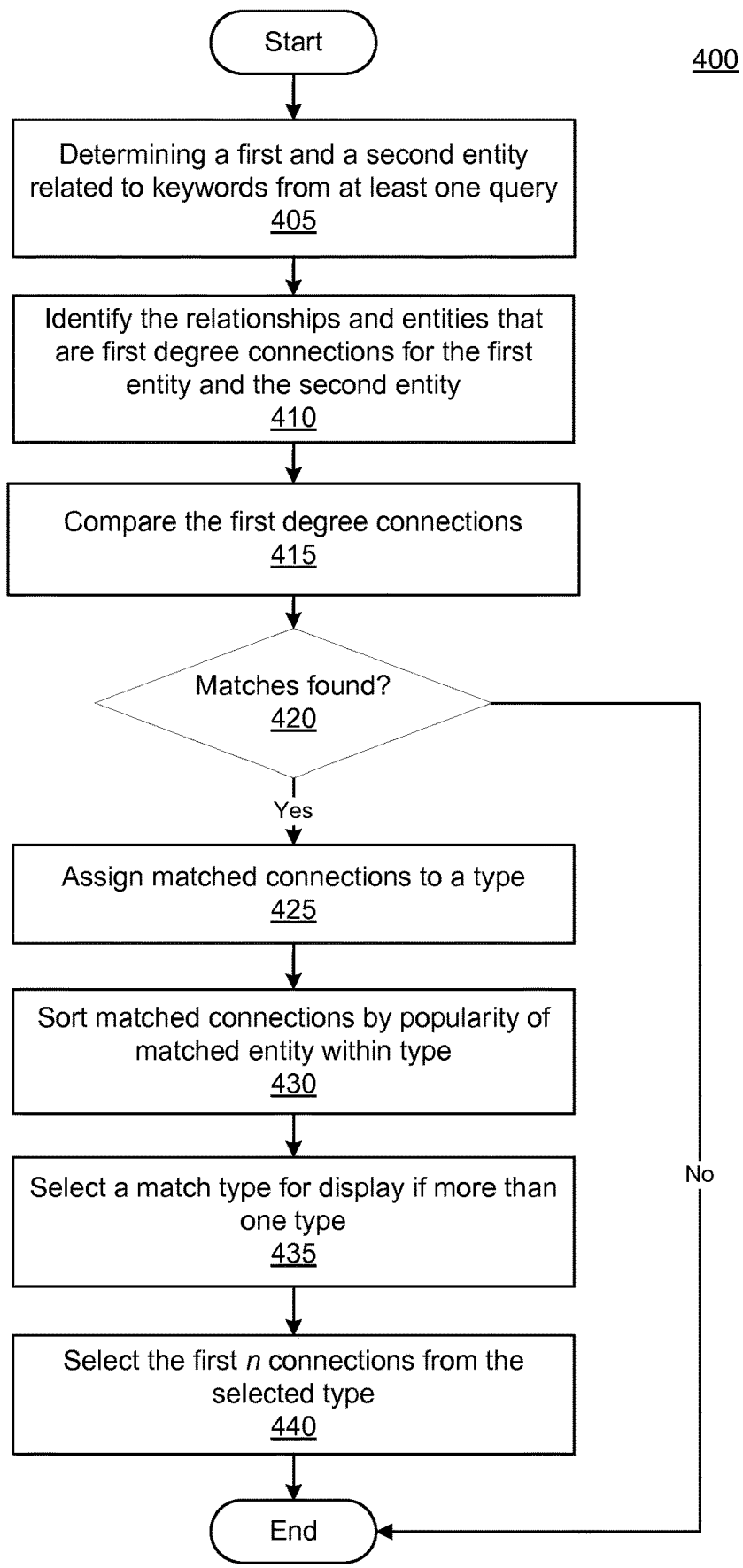
FIG. 4 illustrates a flow diagram of a process for determining common connections to provide as part of a search result.

FIG. 4 illustrates a flow diagram of an example process 400 for identifying common connections to provide as part of a search result, in accordance with some implementations. Process 400 may be performed by a query system, such as query system 120 of FIG. 1, after the query system receives a query. Process 400 may begin by determining a first entity and a second entity based on keywords from at least one query (405). As explained above, the keywords may be from a single query or from two related queries. A related query may be a query submitted as a result of user selection of information returned as part of a search result for a first query or from a query in the user's browser history.

Using the keywords, the query system may determine whether any entities in the data graph correspond to the keywords. For example, in some implementations entities may be associated with one or more aliases that match a keyword from the query or queries. In some implementations, the index for a data graph may include entries that assist text searches for entities. In some implementations one or more documents identified as responsive to keywords in the query may be associated with an entity. For example if the query is "Tom Hanks and Meg Ryan" the query resolver may determine that the entity Tom Hanks relates to the keywords "Tom Hanks" and that the entity Meg Ryan relates to the keywords "Meg Ryan" based on one or more of the methods above.

In some implementations, the query resolver of a query system may determine that the first entity relates to keywords from the current query and the second entity relates to keywords from a previous query. For example, a query requestor may have originally submitted a query for "Tom Hanks" In response, the query system may have generated search results that include a link for Meg Ryan, because Tom Hanks and Meg Ryan co-star in the same movie or because other users have searched for Meg Ryan in conjunction with Tom Hanks. When presented with the search results, the requestor may select the Meg Ryan link. The selection of the link may cause another query to be submitted to the query system. The query system may determine that the current query was a search result of a prior query, and determine that the prior query and the current query each relate to an entity. While FIG. 4 indicates that two entities are determined, the query system may in fact determine that there, four, or more entities relating to the keywords from the at least one query. For example, if a user submitted a query for "Tom Hanks, Meg Ryan, and Nora Ephron" the query system may determine that the entities Tom Hanks, Meg Ryan, and Nora Ephron are related to the keywords and search for connections common between the three entities.

Figure 2:
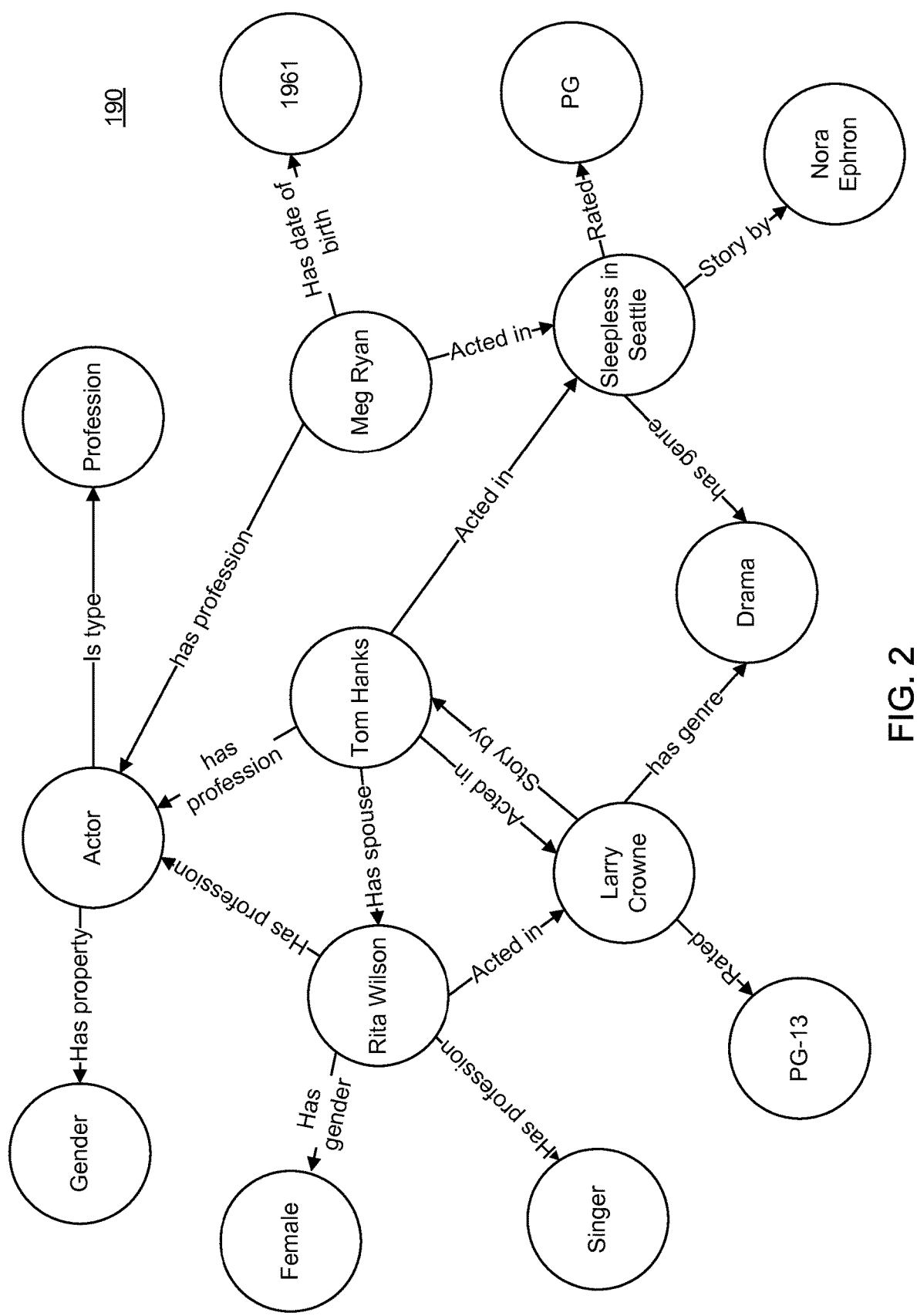
FIG. 2 illustrates a representation of a data graph, with entities as nodes and relationships as edges between nodes.

The query system may then identify out-bound relationships for each of the two, or more, entities, and the target entities each relationship connects to (410). Such connections may be referred to as a first-degree connection because they are connected to the entity by a single relationship. A first-degree connection may include the relationship and the target entity. For example, using the data graph of FIG. 2, the entity Tom Hanks has four out-bound relationships, has profession, has spouse, and two acted in relationships. The target entity for the has spouse relationship is Rita Wilson, the target entity for the has profession relationship is Actor, and the target entities for the acted in relationships are Larry Crowne and Sleepless in Seattle. Meg Ryan has three outbound relationships, has profession with a target entity of Actor, has date of birth with a target entity of 1961, and acted in with a target entity of Sleepless in Seattle. It is to be understood that the graph of FIG. 2 may have hundreds of out-bound relationships for any particular entity and that FIG. 2 is illustrated with only a few such relationships for the sake of brevity.

The query system may compare the first degree connections of each entity to determine if there are matches (415). For example, in the example of FIG. 2, the entities Tom Hanks and Meg Ryan each have a has profession→ACTOR first degree connection and an acted in→SLEEPLESS IN SEATTLE first degree connection. If no matches are found (420, No), process 400 ends because there are no common connections to include in search results. But if matches are found (420, Yes), the query system may assign matches a match type (425). In some implementations the match types may be assigned based on the target entity. For example, the first degree connection with a target entity of Sleepless in Seattle may be assigned a type of "movie" because the entity Sleepless in Seattle is a movie. Similarly, the first degree connection with a target entity of Actor may be assigned a type of "profession" because Actor is a profession. In some implementations the types may be assigned based on the relationship, so that each first degree connection with the same relationship receives the same type.

The query system may then sort the target entities by popularity within match type (430). For example, each target entity may have a property indicating how popular the entity is. Popularity may be determined by the number of relationships the entity has in the data graph, or on how many times the entity appears in queries and/or how many times the entity is mentioned in documents in the document repository. If there is more than one match type, the query system may select one of the types for use in the search result (435). For example, the query system may select the match type with the most members or the match type with the most popular target entities. For example, the query system may select the "movies" match type because the "movies" match type is more popular than the "profession" match type or because the "movies" type has more matches. For example, other movies that Tom Hanks and Meg Ryan acted in, although not shown in the data graph of FIG. 2, do exist, so the movie type will have more entries than the profession type.

Having selected a match type, in some implementations the query system may select a predetermined number of first degree connections for use in a search result (440). For example, if the number of first degree connections in the selected match type exceeds five connections, the query system may select the most popular five connections for the result list. In some implementations if other first degree connections exist beyond the five, the search result may include a "see more" link or button that allows the query requestor to view the additional connections, such as link 320 of FIG. 3. Process 400 may then end having found common connections between two or more entities related to a current query. Process 400 may provide any identified common connections to the query processor for use in determining search results. For example, the common connections may be displayed ahead of documents from a document corpus, such as the Internet, that are found to be responsive to the search query.

Figure 5:
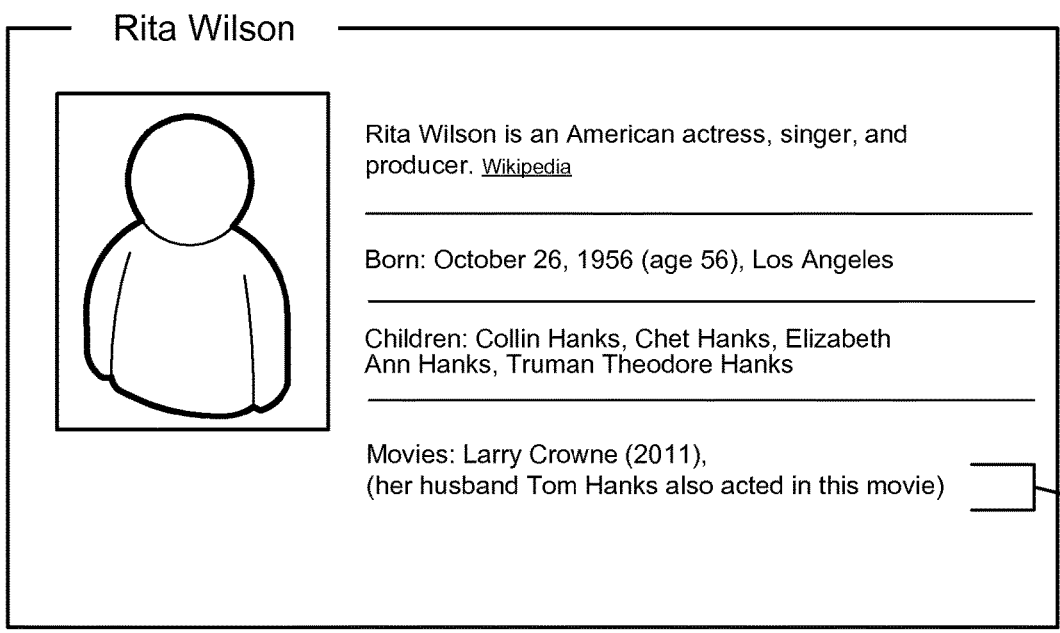
FIG. 5 illustrates an example of a user interface showing a rare connection as part of a search result, in accordance with some implementations.

FIG. 5 illustrates an example of a user interface 500 showing a rare connection as part of a search result, in accordance with some implementations. A query system, such as query system 120 of FIG. 1, may generate information used to display user interface 500 as part of responding to queries. In some implementations, the rare connection may have been pre-computed offline prior to the receipt of the query. For example, a connection finder, such as connection finder 115 of FIG. 1 may pre-compute rare connections for entities in a data graph on a periodic basis. The facts may be stored for later use and retrieval by the query system after a query has been received. In some implementations, the pre-computed rare connections may be stored as a property of an entity in the data graph. In some implementations, the pre-computed rare connections may be stored in a separate datastore, such as insightful connections 153 of FIG. 1, by entity.

User interface 500 may represent one way of displaying information retrieved from a data graph in response to a query. For example, if a query requestor submits a query for "Rita Wilson," the data graph may provide first-connection information from the data graph, such as when Ms. Wilson was born, movies she has starred in, children, etc. In addition, the query system may provide rare connection 505 that adds additional interesting information to the search result that is not first-connection information, but does relate to a first connection. In the example of FIG. 5, the rare connection may inform the query requestor that Ms. Wilson has acted in a movie with her spouse, Tom Hanks. This may be considered a rare connection because although many people have spouses, not many people have acted in a movie with their spouse. In some implementations, user interface 500 may be part of a larger search result that also includes, for example, information for documents from a corpus that are responsive to the search query.

Figure 6:
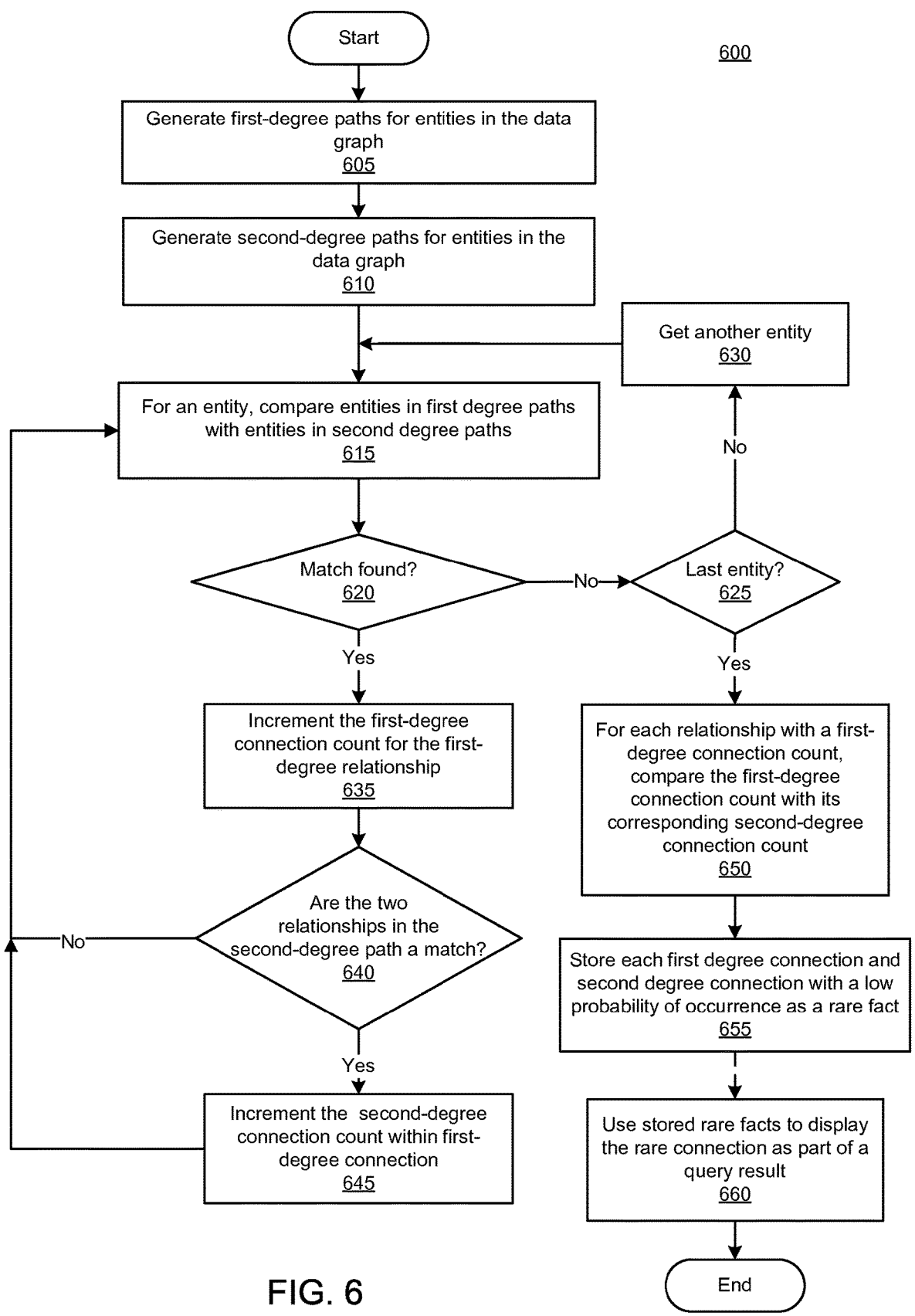
FIG. 6 illustrates a flow diagram of a process for determining a rare connection to provide as part of a search result.

FIG. 6 illustrates a flow diagram of a process for determining a rare connection that can be provided as part of a search result. Process 600 may be performed by a query system at query time or by a connection discovery system, such as connection discovery system 110 of FIG. 1, prior to receipt of a query. In the example of FIG. 6, process 600 is described as carried out by a connection discovery system prior to receipt of a query, but process 600 may equally be carried out by the query system. Process 600 may begin by generating first-degree paths for entities in the data graph (605). The first-degree paths for a particular entity are the out-bound relationships from the particular entity and the entities they lead to, as explained above with regard to step 410 of FIG. 4. The collection of first-degree paths may be considered a first-degree entity graph for the particular entity. The connection discovery system may store the first-degree entity graph for each entity. The connection discovery system may then use the first-degree paths in the entity graph to generate second-degree paths for the entities in the data graph (610). Second-degree paths are paths that lead from a particular entity to a third entity passing through a second entity. For example, In FIG. 2 the entity Tom Hanks has a second-degree path of acted in→SLEEPLESS—rated→PG, a second-degree path of acted in→SLEEPLESS—story by→Nora Ephron, a second-degree path of acted in→LARRY CROWNE—rated→PG-13, a second-degree path of has spouse→RITA WILSON—has profession→SINGER, etc. A second-degree path may be generated by iterating the target entities in a first-degree path for a starting entity and concatenating the first-degree paths for the target entity to the first-degree path for the starting entity. Thus, a second-degree path may have a path length of two relationships for each starting entity. The collection of second-degree paths for a particular entity may be considered a second-degree entity graph for that particular entity.

In some implementations, the connection discovery system may filter out commonly occurring entities and commonly occurring relationships when building the first-degree and second-degree paths. A commonly occurring entity is an entity that has an unusually high number of in-bound relationships. For example, in a large data graph a commonly occurring entity may be an entity with more than 10,000 in-bound relationships. For example, in FIG. 2, the Female entity is likely to have too many in-bound edges because approximately half of the entities representing people have a gender of female. A commonly occurring relationship is a relationship that has an unusually high number of target entities. For example, a commonly occurring relationship may be a relationship with more than 500 unique target entities. For example, the relationship has child may be a commonly occurring relationship because it has too many unique target entities. The connection discovery system may ignore such commonly occurring entities and commonly occurring relationships when building the first-degree and second-degree paths for the entities in the data graph. The numbers 10,000 and 500 are given as one example and it is understood that the commonly occurring threshold may depend on the size of the data graph and the number of unique relationships and entities in the data graph.

For each entity with computed first-degree and second-degree paths, the connection discovery system may compare target entities in the first-degree paths with target entities in the second-degree paths to determine whether there are matching entities (615). For example, if a first degree path of a→B exists for a particular entity, where a is the relationship and b is the target entity in the first-degree path and a second-degree path of c→D-e→B exists, where c and e are relationships and d and b are entities, the connection discovery system may determine that the first-degree path and the second-degree path have matching entities (620, Yes) because both paths end with entity b. When a match is found, the connection discovery system may increment a connection count for the first-degree relationship (635). For example, in FIG. 2, the entity Tom Hanks has a first-degree connection to the entity Rita Wilson with a relationship of has spouse. The entity Tom Hanks also has a second-degree connection to the entity Rita Wilson through the entity Larry Crowne, because each relationship in the data graph may be assumed to have a corresponding inverse relationship. For example, in addition to the out-bound acted in relationship, the data graph may have an assumed in-bound stars relationship between the entities Rita Wilson and Larry Crowne. Thus, Rita Wilson is a matching entity from the first-degree paths and the second-degree paths of Tom Hanks and the connection discovery system may increment a count for the has spouse relationship. In some implementations, for each relationship encountered in a first-degree path the connection discovery system may keep a structure that includes a count and an array that stores a count of matching secondary relationships. The following pseudo-code represents one format that may be used in some implementations:

```
relationship1 {
  int count;
  repeated relationship2 {
    int count
  }
}
``` where relationship1 is the relationship found in the first-degree path and relationship2 is the relationship found in the second-degree path.

The connection discovery system may then determine whether the two relationships in the second-degree path are a match (640). Matching relationships are the same relationship or a relationship and its inverse. For example, the has child and has parent relationships are matching because the has parent relationship is an inverse of has child. Likewise, the acted in and stars relationships match because stars is the inverse of acted in. In some implementations, the connection discovery system may look at the first-degree paths of the target entity to see if they contain a first-degree path that matches the start of the second-degree path for the entity being processed. In other words, the connection discovery system may look to see if a first degree path of acted in→LARRY CROWNE exists for both the Tom Hanks and the Rita Wilson entities. If a matching first-degree path is found, the relationships in the second-degree path may be considered a match. If the two relationships in the second-degree path are a match (640, Yes), the connection discovery system may increment a counter for the second-degree connection with the first degree connection (645). For example, in FIG. 2, the connection discovery system may increment a counter for has_spouse.acted_in (e.g., has spouse is relationship) and acted in is relationship 2 in the structure above) when the first-degree path of TOM HANKS—has spouse→RITA WILSON is matched with the second-degree path of TOM HANKS—acted in→LARRY CROWNE—stars→RITA WILSON. The connection matching system may then continue comparing entities between the first-degree paths and the second-degree paths for the particular entity (615).

If the two relationships in the second-degree path do not match (640, No), the connection discovery system may skip incrementing the counter for the second-degree relationship. For example, in FIG. 2, the connection discovery system may not increment any second-path counter when the first-degree path of TOM HANKS—has spouse→RITA WILSON is matched with the second-degree path of TOM HANKS—wrote→LARRY CROWNE—stars→Rita Wilson because the stars relationship does not match the wrote relationship. Thus, in this example, the connection discovery system may increment the has spouse relationship (e.g., the count for relationship1, performed in step 635), but would not increment any other counter. Instead, the connection discovery system may continue matching target entities, for example at step 615.

If no remaining matches are found (620, No), the connection discovery system may determine whether the matching process of steps 615 to 645 has been carried out for each entity with first-degree paths (625). If not, (625, No), the connection discovery system may continue with the next entity (630). If all entities have been examined (625, Yes), the connection discovery system may iterate through the first-degree connection counts, comparing the count to each corresponding second-degree connection count (650). For example, using the structure above, the connection discovery system may compare each relationship2.count associated with relationship1 with the relationship1.count. When the relationship1.count is large and the relationship2.count is small, the connection discovery system may determine that the co-occurrence of a first-degree relationship1 between two entities and a second-degree relationship2 between the same two entities and a third entity is small. The connection discovery system may store each first-degree relationship and second-degree relationship with a low co-occurrence as a rare fact (655). For example, in some implementations, the connection discovery system may store the rare fact relationships in a datastore, such as insightful connections 153 of FIG. 1. In some implementations the connection discovery system may apply the facts to the first-degree paths and second-degree paths previously constructed, for example as part of steps 605 and 610, to identify entities where the co-occurrence appears. The connection discovery system may then store the rare fact relationship by entity in a datastore, so that the rare fact may be retrieved with minimal processing at query time. In some implementations, the rare fact may be stored in the data graph itself as a special type of relationship between the two entities.

After a query has been received, the stored rare facts may be used to enhance the search results for appropriate entities (660). For example, if a query system receives a query that matches an entity with a stored rare fact, the query system may include the rare fact in the search results returned in response to the query. As indicated by the dashed line, step 660 may occur some time after the rare facts have been calculated, but it need not be. The query system may add additional information to the rare fact to generate data used in the display of the fact. For example, the query system may add text aliases to identify the entities to make the rare fact more discernible to the search requestor. For implementations where the connection discovery system computes rare facts separately from query receipt, step 660 may be repeated a number of times independently from steps 605 to 655. Process 600 may then end, having provided a mechanism for supplying rare connections as part of a search result.

FIG. 7 illustrates an example of a user interface 700 showing a strong secondary connection as part of a search result, in accordance with some implementations. A query system, such as query system 120 of FIG. 1, may generate information used to display user interface 700 as part of responding to queries. In some implementations, the strong secondary connection may have been pre-computed offline prior to the receipt of the query. For example, a connection finder, such as connection finder 115 of FIG. 1 may pre-compute strong secondary connections for entities in a data graph on a periodic basis. In some implementations, the connection finder may compute strong secondary connections as part of a process that also computes rare connections as described above with regard to FIG. 6. The strong secondary connections may be stored for later use and retrieval by the query system after a query has been received. In some implementations, the pre-computed strong secondary connections may be stored as a property of an entity in the data graph. In some implementations, the pre-computed strong secondary connections may be stored in a separate datastore, such as insightful connections 153 of FIG. 1, by entity.

User interface 700 represents one example of displaying information retrieved from a data graph in response to a query. For example, if a query requestor submits a query for "Tom Hanks," the data graph may provide first-connection information from the data graph, such as when Mr. Hanks was born, who he is married to, children he has, etc. In addition, the query system may provide a strong secondary connection 705 that adds additional insightful information to the search result that is not first-connection information, but relates to a plurality of first connections. In the example of FIG. 7, the strong secondary connection may inform the query requestor that Mr. Hanks has acted in 49 drama films. This may be considered a strong secondary connection because the entity Tom Hanks has a high number of second-degree paths that terminate with the drama entity. In some implementations, user interface 700 may be part of a larger search result that also includes, for example, information for documents from a corpus that are responsive to the search query.

Figure 8:
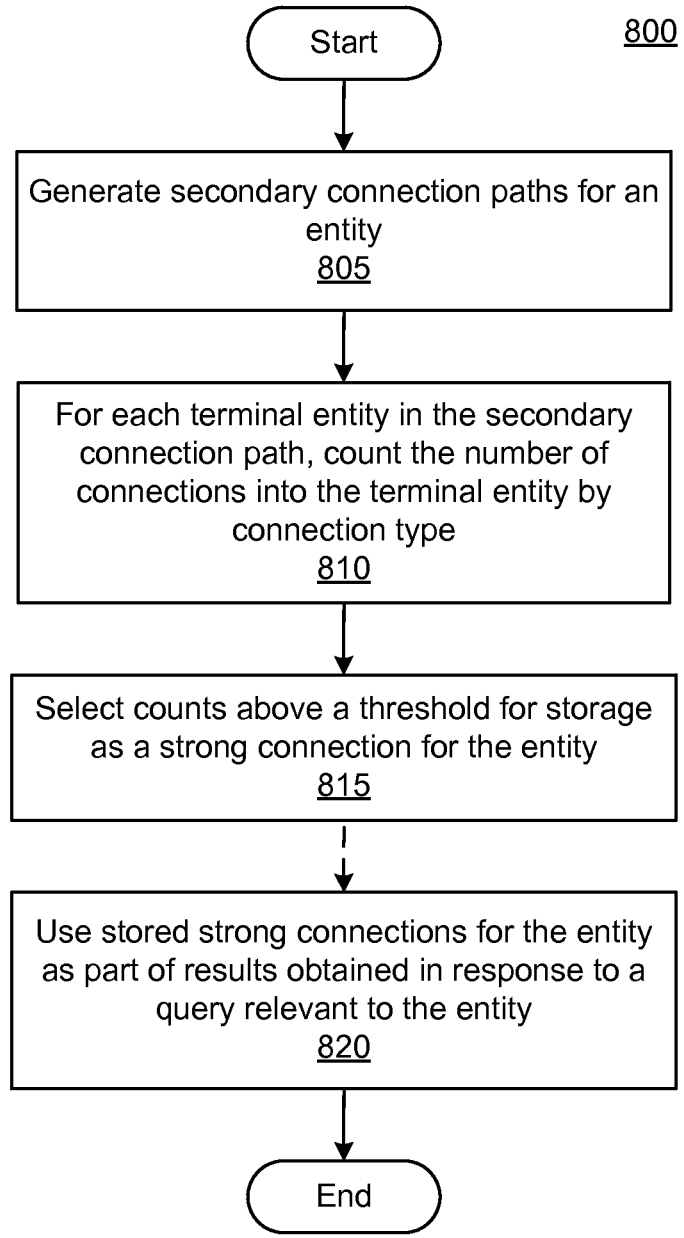
FIG. 8 illustrates a flow diagram of a process for determining a strong secondary connection for an entity, in accordance with some implementations.

FIG. 8 illustrates a flow diagram of a process for determining strong secondary connections that can be provided as part of a search result. Process 800 may be performed by a query system at query receipt time or by a connection discovery system, such as connection discovery system 110 of FIG. 1, prior to receipt of a query. In the example of FIG. 8, process 800 is described as carried out by a connection discovery system prior to receipt of a query, but process 800 may equally be carried out by the query system. Process 800 of FIG. 8 is described for a single entity in the data graph, but it will be understood that process 800 may be repeated for any number of entities in the data graph. Process 800 may begin with creation of second-degree paths for the entity (805). As described above, the connection discovery system may exclude commonly occurring relationships and commonly occurring entities from the second-degree path creation. Furthermore, in implementations that calculate rare connections and strong secondary connections concurrently, step 805 may be performed as part of step 610 of FIG. 6.

The connection discovery system may then iterate through the terminal entities in the second-degree paths and count the number of connections into the terminal entity by connection type (810). In other words, for each final entity in the second-degree paths, the connection discovery system may assign a connection type to each relationship and count the number of relationships for each type that lead to the terminal entity. For example, the entity Tom Hanks may have a second-degree path of acted in→LARRY CROWNE—has genre→DRAMA. In one implementation, Drama is the terminal entity and has genre is the relationship assigned a connection type. In another implementation, Drama is the terminal entity and acted in/has genre is assigned a connection type. In such an implementation, this connection type would differ from the connection type for a second-degree path of wrote→LARRY CROWNE—has genre→DRAMA. In some implementations, each relationship and its inverse may receive the same connection type. The connection discovery system may then select connection types with a count that meets a threshold as strong secondary connections (815). The threshold may be a minimum number that represents the number of second-degree paths of the same connection type that the entity needs with the terminal entity to qualify as a strong connection. The connection discovery system may store the terminal entity and the connection type with the count as a strong secondary connection when the count meets the threshold (815). For example, the terminal entity and the relationship(s) or connection type may be stored as a property of the entity in the data graph, or as an entry in a datastore, such as insightful connections 153 of FIG. 1.

After a query has been received, the stored strong secondary connections may be used to enhance the search results for appropriate entities (820). For example, if a query system receives a query that matches an entity with a stored strong secondary connection, the query system may include the strong secondary connection in the search results returned in response to the query. As indicated by the dashed line, step 820 may occur at some later time, after the strong secondary connections have been calculated, but it need not be. The query system may add additional information to the strong secondary connection information to generate data used in the display of the fact. For example, the query system may add information about the entities that connect the source entity and the target entity, such as the movie titles shown in FIG. 7. For implementations where the connection discovery system computes strong secondary connections separately from query receipt, step 820 may be repeated a number of times independently from steps 805 to 815. Process 800 may then end, having provided a mechanism for supplying strong secondary connections as part of a search result.

FIG. 9 illustrates an example of a user interface 900 showing unique facts for an entity as part of a search result, in accordance with some implementations. A query system, such as query system 120 of FIG. 1, may generate information used to display user interface 900 as part of responding to queries. In some implementations, the unique facts may have been pre-computed offline prior to the receipt of the query. For example, a unique fact finder, such as unique fact finder 116 of FIG. 1 may pre-compute unique facts for entities in a data graph on a periodic basis. The unique fact finder may compute unique facts as part of a process that also computes rare connections and/or strong secondary connections as described above with regard to FIGS. 6 and 8. The unique facts may be stored for later use and retrieval by the query system after a query has been received. In some implementations, the pre-computed unique facts may be stored as a property of an entity in the data graph. In some implementations, the pre-computed unique facts may be stored in a separate datastore by entity, such as for example, insightful connections 153 of FIG. 1.

User interface 900 represents one example of displaying information retrieved from a data graph in response to a query. For example, if a query requestor submits a query for "Meryl Streep," the query system may provide first-connection information from the data graph, such as movies Ms. Streep has acted in and other information. In addition, the query system may provide unique facts 905 that add additional insightful information to the search result. The unique facts may highlight distinctions that the entity has when compared to other similar entities. The unique facts may include superlatives that the entity can claim, such as the most, the tallest, the wealthiest, etc. In the example of FIG. 9, the unique facts may inform the query requestor that Ms. Streep is among the actors that have the most number of nominations, the most Oscar nominations, won the most awards, etc. Such unique facts may be considered collection outliers because, for a given collection of entities, the displayed information has a value that most other entities in the collection do not have. In addition to being displayed in response to a query for a particular entity, the unique facts may also be used to directly answer queries that specify the collection and the fact, such as "who is the tallest actor?" and "what is the richest country?" In some implementations, user interface 900 may be part of a larger search result that also includes, for example, information for documents from a corpus that are responsive to the search query.

Figure 10:
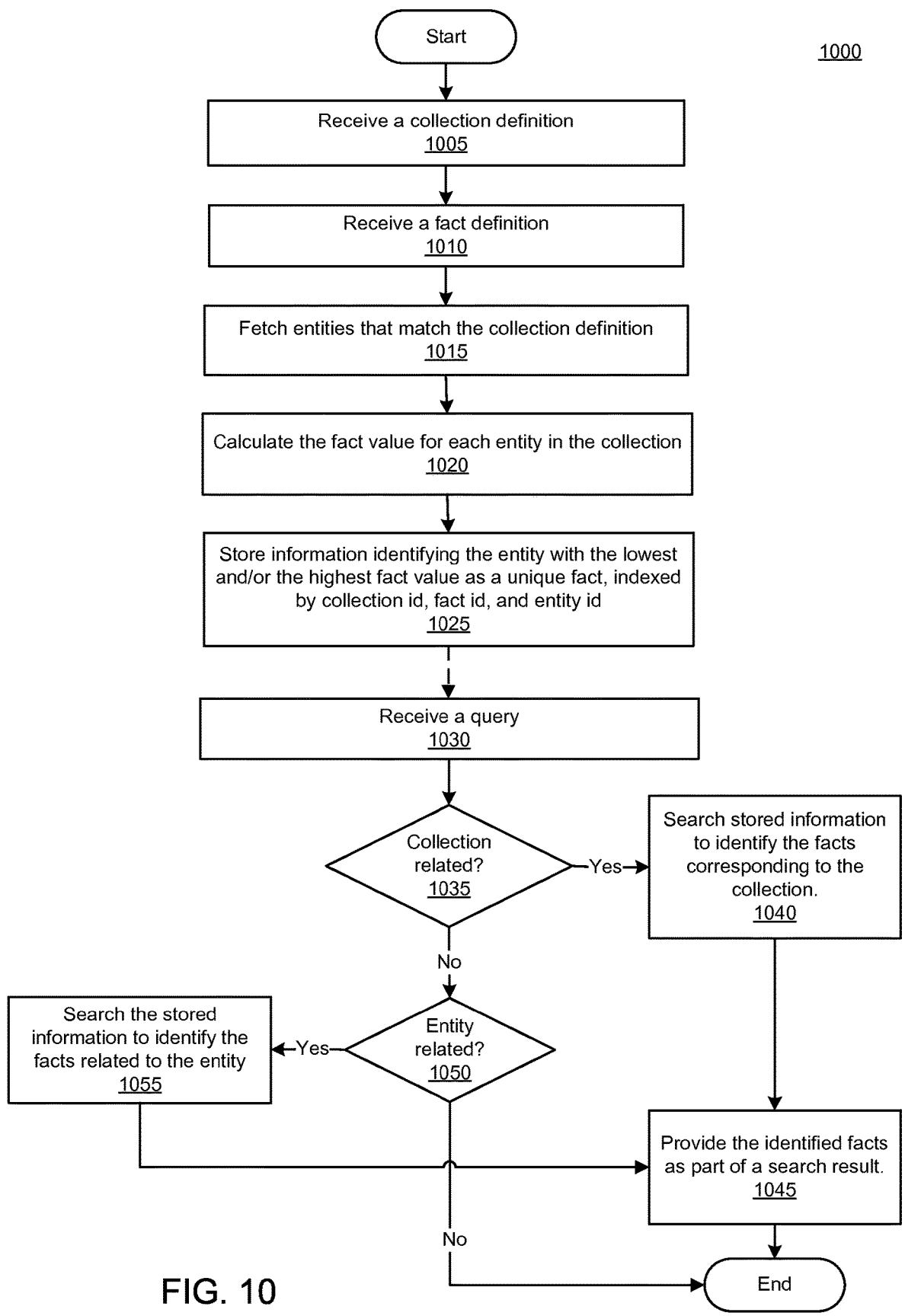
FIG. 10 illustrates a flow diagram of a process for determining a unique fact for an entity, in accordance with some implementations.

FIG. 10 illustrates a flow diagram of a process for determining unique facts that can be provided as part of a search result. Process 1000 may be performed by a query system at query time or by a connection discovery system, such as connection discovery system 110 of FIG. 1, prior to receipt of a query. In the example of FIG. 10, process 1000 is described as carried out by a connection discovery system prior to receipt of a query, but process 1000 may equally be carried out by the query system. Process 1000 may begin with receiving a definition of a collection (1005). A collection may be defined by a collection name, a collection identifier, and the constraints that entities must meet to be considered a member of the collection. Collection constraints may include properties that an entity possesses, such as an associated domain, a location, a profession, a date of birth, a specified relationship etc. For example, collections may be actors, countries in the world, states in the United States of America, politicians who are Democrats, etc. Collections may be generic, for example actors, or specific, such as actors born in China.

In some implementations, the connection discovery system may provide a user interface that allows a user to input the name and collection constraints. This information may be stored along with a collection identifier in a datastore, such as collection definition 151 of FIG. 1. Thus, receipt of the collection definition may be directly from a user. In some implementations, the user may have previously provided the collection definition and the connection discovery system may receive the collection definition from the datastore, such as, for example, when process 1000 is performed automatically on a periodic basis.

The connection discovery system may then receive a fact definition (1010). A fact is a value that can be computed from information in the data graph. The fact definition may include a name, an identifier, a value format that allows for interpretation of the value, and a set of rules or an expression for calculating the fact value for each entity. In some implementations, the fact definition may also include an indication of the interesting side of the fact value. For example, a fact may be for mountain height and the tallest mountain may be interesting while the shortest mountain may not be interesting. On the other hand, the fact may be for actor height and the tallest and the shortest actors may be considered interesting. Thus, the fact definition may include an indication of whether the highest or the lowest value, or both, should be kept in the unique facts. Some implementations may also include a text phrase for presenting the fact.

In some implementations the connection discovery system may provide a user interface that allows a user to input the fact definition. The fact definition may be stored in the datastore, such as fact definition 150 of FIG. 1. Thus, receipt of the fact definition may be directly from a user. In some implementations the user may have previously provided the fact definition and the connection discovery system may receive the fact definition by retrieving the definition from storage. The connection discovery system may then fetch entities that match the collection definition from the data graph (1015). For example, the collection definition may indicate that entities with a profession of actor are included in the collection. Thus, in this example, the connection discovery system may find the entities from the data graph that have a first-degree profession relationship with the actor entity. For each of the entities in the collection, the connection discovery system may calculate the fact value (1020) using the fact definition. For example, the fact may be the number of Oscar nominations for the entity, which may be defined as the number of Oscar nomination relationships between the entity and movie entities in the data graph. Or, the fact may be for the number of Oscars won, which may be defined as the number of won Oscar relationships between the entity and a movie entity. In some implementations the relationship may have an attribute, and the attribute may be part of the fact definition. For example, the fact may be for the number of Best Actress Oscars won, and the won Oscar relationship may have an associated attribute of Best Actress. In such implementations, the connection discovery system may count only won Oscar relationships with the matching attribute of Best Actress.

After computing the fact value for each entity in the collection, the connection discovery system may determine which entity has the highest or lowest value, or both, and store information identifying the collection, the fact, and the entity with the fact value as a unique fact (1025). For example the unique facts may be stored in a datastore, such as insightful connections 153 of FIG. 1. Each unique fact may include the fact value, and identifiers for the entity, the collection/fact pair. The connection discovery system may index the unique facts by the entity id so that a query system may retrieve unique facts for a particular entity quickly. The connection discovery system may also index the unique facts by collection/fact pair so that a query system may retrieve the unique facts for a particular collection quickly.

Steps 1005 to 1025 of process 1000 are described for a single collection and a single fact, but it will be understood that these steps may be repeated for any number of collections and any number of facts per collection prior to receipt of a query. Thus, the connection discovery system may perform steps 1005 through 1025 for a plurality of collections and facts on a periodic basis.

A query system may then receive a query (1030). The query system may receive the query independently from steps 1005 to 1025, or the query system may perform steps 1005 to 1025 in response to receipt of the query. The query may be associated with keywords that correspond to entities in the data graph. The query system may analyze the keywords to determine what entities correspond to the query. The query system may also analyze the keywords to determine whether the keywords correspond to a stored collection definition and fact definition. If the query is related to a stored collection (1035, Yes), the query system may obtain unique facts from storage that correspond to the collection. For example, if the query is for the tallest mountain in the United States, the query system may determine that the query is related to the collection for mountains in the United States and, more specifically, to the fact for height within that collection. Accordingly, the query system may retrieve the unique fact for "the tallest" within the collection of "mountains in the United States." The query system may include the fact value in the search results for the query (1045).

If the query is not related to a collection, the query system may determine whether the query is related to an entity (1050). If so (1050, Yes), the query system may search the stored unique facts for any facts corresponding to the entity. For example, if the query is related to the Meryl Streep entity, the query system may obtain any unique facts corresponding to this entity. The query system may provide all or a portion of the unique facts as part of the search result (1045), as shown in FIG. 9. If the query is not related to a collection or an entity, process 1000 may simply end. Thus, process 1000 allows a search result to be enhanced with unique facts for an entity related to the search query or as a direct answer to a search query that corresponds to a collection/fact pair.

Figure 11:
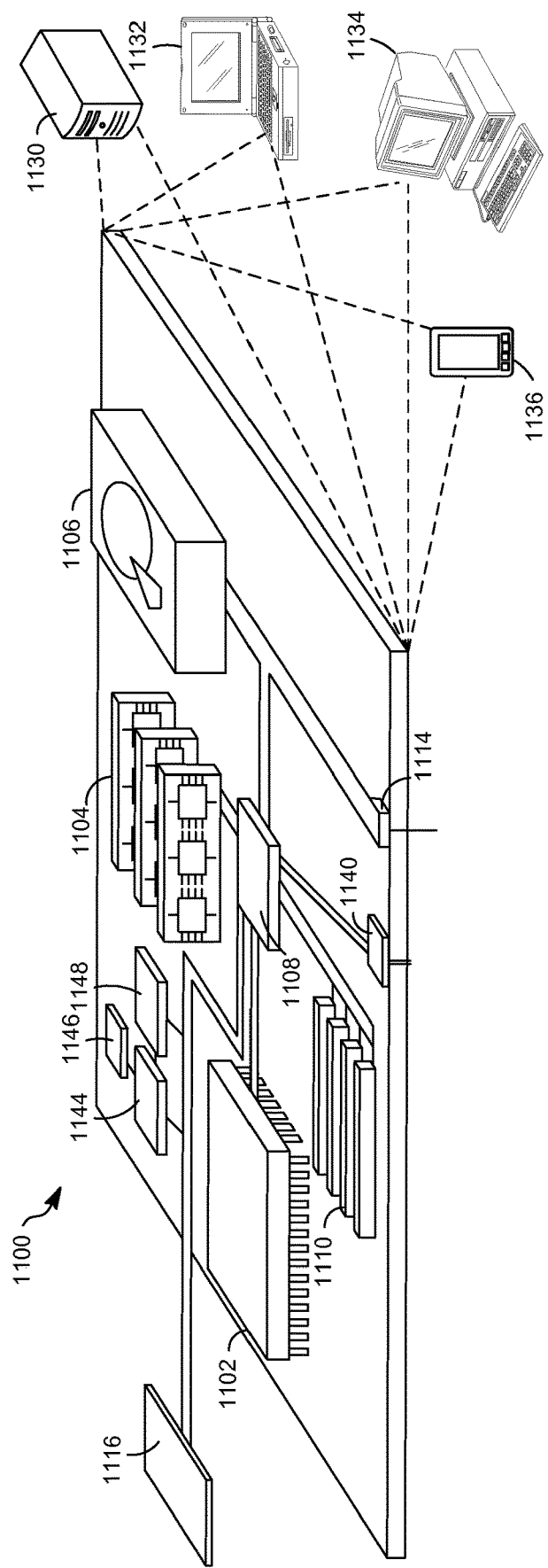
FIG. 11 shows an example of a computer device that can be used to implement the described techniques.

FIG. 11 shows an example of a generic computer device 1100, which may be system 100, and/or client 170 of FIG. 1, which may be used with the techniques described here. Computing device 1100 is intended to represent various example forms of computing devices, such as laptops, desktops, workstations, personal digital assistants, cellular telephones, smart phones, tablets, servers, and other computing devices, including wearable devices. The components shown here, their connections and relationships, and their functions, are meant to be examples only, and are not meant to limit implementations of the inventions described and/or claimed in this document.

Computing device 1100 includes a processor 1102, memory 1104, a storage device 1106, and expansion ports 1110 connected via an interface 1108. In some implementations, computing device 1100 may include transceiver 1146, communication interface 1144, and a GPS (Global Positioning System) receiver module 1148, among other components, connected via interface 1108. Device 1100 may communicate wirelessly through communication interface 1144, which may include digital signal processing circuitry where necessary. Each of the components 1102, 1104, 1106, 1108, 1110, 1140, 1144, 1146, and 1148 may be mounted on a common motherboard or in other manners as appropriate.

The processor 1102 can process instructions for execution within the computing device 1100, including instructions stored in the memory 1104 or on the storage device 1106 to display graphical information for a GUI on an external input/output device, such as display 1116. Display 1116 may be a monitor or a flat touchscreen display. In some implementations, multiple processors and/or multiple buses may be used, as appropriate, along with multiple memories and types of memory. Also, multiple computing devices 1100 may be connected, with each device providing portions of the necessary operations (e.g., as a server bank, a group of blade servers, or a multi-processor system).

The memory 1104 stores information within the computing device 1100. In one implementation, the memory 1104 is a volatile memory unit or units. In another implementation, the memory 1104 is a non-volatile memory unit or units. The memory 1104 may also be another form of computer-readable medium, such as a magnetic or optical disk. In some implementations, the memory 1104 may include expansion memory provided through an expansion interface.

The storage device 1106 is capable of providing mass storage for the computing device 1100. In one implementation, the storage device 1106 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in such a computer-readable medium. The computer program product may also contain instructions that, when executed, perform one or more methods, such as those described above. The computer- or machine-readable medium is a storage device such as the memory 1104, the storage device 1106, or memory on processor 1102.

The interface 1108 may be a high speed controller that manages bandwidth-intensive operations for the computing device 1100 or a low speed controller that manages lower bandwidth-intensive operations, or a combination of such controllers. An external interface 1140 may be provided so as to enable near area communication of device 1100 with other devices. In some implementations, controller 1108 may be coupled to storage device 1106 and expansion port 1114. The expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 1100 may be implemented in a number of different forms, as shown in the figure. For example, it may be implemented as a standard server 1130, or multiple times in a group of such servers. It may also be implemented as part of a rack server system. In addition, it may be implemented in a personal computer such as a laptop computer 1122, or smart phone 1136. An entire system may be made up of multiple computing devices 1100 communicating with each other. Other configurations are possible.

FIG. 12 shows an example of a generic computer device 1200, which may be system 100 of FIG. 1, which may be used with the techniques described here. Computing device 1200 is intended to represent various example forms of large-scale data processing devices, such as servers, blade servers, datacenters, mainframes, and other large-scale computing devices. Computing device 1200 may be a distributed system having multiple processors, possibly including network attached storage nodes, that are interconnected by one or more communication networks. The components shown here, their connections and relationships, and their functions, are meant to be examples only, and are not meant to limit implementations of the inventions described and/or claimed in this document.

Distributed computing system 1200 may include any number of computing devices 1280. Computing devices 1280 may include a server or rack servers, mainframes, etc. communicating over a local or wide-area network, dedicated optical links, modems, bridges, routers, switches, wired or wireless networks, etc.

In some implementations, each computing device may include multiple racks. For example, computing device 1280a includes multiple racks 1258a-1258n. Each rack may include one or more processors, such as processors 1252a-1252n and 1262a-1262n. The processors may include data processors, network attached storage devices, and other computer controlled devices. In some implementations, one processor may operate as a master processor and control the scheduling and data distribution tasks. Processors may be interconnected through one or more rack switches 1258, and one or more racks may be connected through switch 1278. Switch 1278 may handle communications between multiple connected computing devices 1200.

Each rack may include memory, such as memory 1254 and memory 1264, and storage, such as 1256 and 1266. Storage 1256 and 1266 may provide mass storage and may include volatile or non-volatile storage, such as network-attached disks, floppy disks, hard disks, optical disks, tapes, flash memory or other similar solid state memory devices, or an array of devices, including devices in a storage area network or other configurations. Storage 1256 or 1266 may be shared between multiple processors, multiple racks, or multiple computing devices and may include a computer-readable medium storing instructions executable by one or more of the processors. Memory 1254 and 1264 may include, e.g., volatile memory unit or units, a non-volatile memory unit or units, and/or other forms of computer-readable media, such as a magnetic or optical disks, flash memory, cache, Random Access Memory (RAM), Read Only Memory (ROM), and combinations thereof. Memory, such as memory 1254 may also be shared between processors 1252a-1252n. Data structures, such as an index, may be stored, for example, across storage 1256 and memory 1254. Computing device 1200 may include other components not shown, such as controllers, buses, input/output devices, communications modules, etc.

An entire system, such as system 100, may be made up of multiple computing devices 1200 communicating with each other. For example, device 1280a may communicate with devices 1280b, 1280c, and 1280d, and these may collectively be known as system 100. As another example, system 100 of FIG. 1 may include one or more computing devices 1200 as connection discovery system 110 or query system 120. Furthermore, some of the computing devices may be located geographically close to each other, and others may be located geographically distant. The layout of system 1200 is an example only and the system may take on other layouts or configurations.

Various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any non-transitory computer program product, apparatus and/or device (e.g., magnetic discs, optical disks, memory (including Read Access Memory), Programmable Logic Devices (PLDs)) used to provide machine instructions and/or data to a programmable processor.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of implementations have been described. Nevertheless, various modifications may be made without departing from the spirit and scope of the invention. In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

What is claimed is:

1. A system comprising:
   a data graph that links entities by relationships, each relationship having one of a plurality of labels;
   an index for searching a document corpus; and
   a query handling system that includes:
      at least one processor, and
      a memory storing instructions that, when executed by the at least one processor cause the query handling system to perform operations including:
         receiving a query,
         generating a search result for the query using the index, based on documents responsive to the query,
         identifying a first entity from the data graph and a second entity from the data graph corresponding to the query,
         identifying first-degree paths from the data graph for the first entity, a first-degree path including a relationship and a target entity,
         identifying first-degree paths from the data graph for the second entity,
         determining that at least one first-degree path for the first entity matches at least one first-degree path for the second entity, the at least one matched first-degree path being a matched connection, and
         including information for the relationship label and the target entity from the matched connection in the search result.

2. The system of claim 1, wherein the instructions further cause the query handling system to perform operations including:
   determining that the query resulted from a selection of a representation of the second entity, the representation being part of a search result for a prior search, the prior search corresponding to the first entity.

3. The system of claim 1, wherein the query handling system determines that a plurality of first-degree paths match, generating a plurality of matched connections, and the instructions further cause the query handling system to perform operations comprising:
   sorting the matched connections by popularity; and
   including information for a predetermined number of the sorted matched connections in the search result.

4. The system of claim 3, wherein the instructions further cause the query handling system to perform operations comprising:
   assigning each matched connection to a group; and
   sorting the matched connections by popularity within group,
   wherein including information for the predetermined number of matched connections includes selecting one of the groups for the including.

5. The system of claim 4, wherein the group with a highest number of matched connections is selected.

6. The system of claim 4, wherein the group with a highest number of popular matched connections is selected.

7. The system of claim 3, wherein popularity for a particular matched connection is based on an amount of appearances in the document corpus of the target entity associated with the particular matched connection.

8. A system comprising:
   a data graph that links entities by relationships; and
   a query handling system that includes:
   at least one processor, and
   a memory storing instructions that, when executed by the at least one processor cause the query handling system to perform operations including:
      generating a first-degree entity graph for a particular entity in the data graph, the first-degree entity graph having first-degree paths each comprising a first-degree relationship and a first-degree entity,
      generating a second degree entity graph for the particular entity in the data graph, the second degree entity graph having second degree paths each comprising a first-second-degree relationship connecting to a first second-degree entity and a second second-degree relationship connecting the first second-degree entity to a second second-degree entity,
      for a particular second second-degree entity in the second-degree paths:
         assigning each second second-degree relationship to a group,
         determining an amount of second second-degree relationships in each group,
         determining that the amount meets a threshold, and
         storing data relating to the particular entity, the second second-degree entity, and the group in a memory for later retrieval in response to queries,
      for a particular first-degree entity in the first-degree paths:
         identifying at least one matching path by identifying a second-degree entity in the second-degree paths that matches the particular first-degree entity,
         determining whether the first second-degree relationship and the second second-degree relationship of the matching path are of the same type, and
         storing data relating to the particular entity and the matching paths for later retrieval in response to queries when the first second-degree relationship and the second second-degree relationship are of the same type.

9. The system of claim 8, further comprising:
   an index for searching a document corpus,
   wherein the query handling system provides a search result in response to queries, the search result including information from the index and information based on the stored data relating to the particular entity.

10. The system of claim 8, wherein the memory further stores instructions that cause the query handling system to perform operations comprising:

receiving a query that relates to the particular entity;
retrieving the data; and
including information from the data in a query result responsive to the query.

11. The system of claim 8, wherein the memory further stores instructions that cause the query handling system to perform operations comprising:
excluding commonly occurring entities and commonly occurring relationships from the first-degree entity graph and second-degree entity graph.

12. The system of claim 8, wherein as part of assigning each second second-degree relationship to a group memory further stores instructions that cause the query handling system to perform operations comprising:
assigning each combination of first second-degree relationship and second second-degree relationship to a group.

\* \* \* \* \*